United States Patent
Smith (10) Patent No.: US 7,634,385 B2
(45) Date of Patent: *Dec. 15, 2009

(54) METHODS OF MEASURING STEAM TURBINE EFFICIENCY

(75) Inventor: Raub Warfield Smith, Ballston Lake, NY (US)

(73) Assignee: General Electric Company, Schenectady, NY (US)

(*) Notice: Subject to any disclaimer, the term of this patent is extended or adjusted under 35 U.S.C. 154(b) by 644 days.

This patent is subject to a terminal disclaimer.

(21) Appl. No.: 11/108,299

(22) Filed: Apr. 18, 2005

(65) Prior Publication Data

US 2005/0182576 A1  Aug. 18, 2005

Related U.S. Application Data

(63) Continuation-in-part of application No. 10/444,153, filed on May 22, 2003, now Pat. No. 6,901,348.

(51) Int. Cl.
*F01D 5/14* (2006.01)

(52) U.S. Cl. ...................................... 702/182

(58) Field of Classification Search .................. 702/182
See application file for complete search history.

(56) References Cited

U.S. PATENT DOCUMENTS

| | | | |
|---|---|---|---|
| 4,410,950 A | 10/1983 | Toyoda et al. | |
| 4,563,746 A | 1/1986 | Yoshida et al. | |
| 5,331,579 A | 7/1994 | Maguire, Jr. et al. | |
| 5,347,466 A * | 9/1994 | Nichols et al. | 703/18 |
| 5,791,147 A | 8/1998 | Earley et al. | |
| 5,794,446 A | 8/1998 | Earley et al. | |
| 6,490,506 B1 | 12/2002 | March | |
| 6,529,849 B2 | 3/2003 | Umezawa et al. | |
| 6,901,348 B2 * | 5/2005 | Smith et al. | 702/182 |
| 7,096,156 B2 | 8/2006 | Hosaka et al. | |

* cited by examiner

*Primary Examiner*—Tung S Lau
(74) *Attorney, Agent, or Firm*—Armstrong Teasdale LLP (57) ABSTRACT

A method for measuring efficiency of a turbine includes operating the power plant at a first load, wherein a gas turbine is operated with a first fuel flow and a first gas turbine inlet air flow, determining a first shaft output at the first load with steam supplied from a heat recovery steam generator (HRSG) to both the first steam turbine inlet and the second steam turbine inlet, maintaining the first gas turbine fuel flow, the first gas turbine inlet air flow, and the first steam turbine inlet steam flow while isolating the second steam turbine from the steam admission flow, determining a second shaft output while the second steam turbine is isolated from the steam admission flow, and determining an expansion efficiency of the second steam turbine based on the first shaft output and the second shaft output and a measured change in second steam turbine admission steam flow.

5 Claims, 9 Drawing Sheets

TYPICAL THREE PRESSURE REHEAT COMBINED CYCLE SYSTEM SCHEMATIC
(Single Shaft Train Arrangement)

FIGURE 1 - TYPICAL THREE PRESSURE REHEAT COMBINED CYCLE SYSTEM SCHEMATIC
(Single Shaft Train Arrangement)

FIGURE 2 - TYPICAL THREE PRESSURE REHEAT COMBINED CYCLE SYSTEM SCHEMATIC
(Multi-Shaft Train Arrangement)

| | Measured Value With LP Admission | Measured Value Without LP Admission | Measured Value With LP Admission | Measured Value Without LP Admission | Units | Bias Error | | | LP Eff = .87 | LP Eff = .89 | LP Eff = .91 | Units |
|---|---|---|---|---|---|---|---|---|---|---|---|---|
| IP Turbine Efficiency | 0.841 | 0.841 | 0.841 | 0.841 | % | | | | 0.841 | 0.841 | 0.841 | % |
| Generator Output Bias Error= | 0 (Truth) | | 465 (+0.3% Bias) | | | | | | | | | |
| LP Steam Admission | | | | | | | | | | | | |
| Flow | 70000 | 0 | 70000 | 0 | Lb/Hr | 1.0 | | | 70000 | 70000 | 70000 | Lb/Hr |
| Pressure | 50.00 | 50.00 | 50.00 | 50.00 | Psia | 0.1 | | | 50 | 50 | 50 | Psia |
| Temperature | 900.00 | 900.00 | 900.00 | 900.00 | °F | 1 | | | 900.00 | 900.00 | 900.00 | °F |
| Enthalpy | 1482.16 | 1482.16 | 1482.16 | 1482.16 | Btu/Lb | | | | 1482.16 | 1482.16 | 1482.16 | Btu/Lb |
| Entropy | 1.9744 | 1.9744 | 1.9744 | 1.9744 | Btu/Lb/°F | | | | 1.9629 | 1.9629 | 1.9629 | Btu/Lb/°F |
| LP Steam Turbine Inlet | | | | | | | Random Error (95% Confidence) | | | | | |
| Flow | 870000 | 800000 | 870000 | 800000 | Lb/Hr | 0.01 | | | 870000 | 870000 | 870000 | Lb/Hr |
| Pressure | 49.25 | 44.35 | 49.25 | 44.35 | Psia | | | | 49.25 | 49.25 | 49.25 | Psia |
| Temperature | 624.45 | 580.26 | 624.45 | 580.26 | °F | | | | 624.45 | 624.45 | 624.45 | °F |
| Enthalpy | 1344.93 | 1323.68 | 1344.93 | 1323.68 | Btu/Lb | | | | 1344.93 | 1344.93 | 1344.93 | Btu/Lb |
| Entropy | 1.8502 | 1.8417 | 1.8502 | 1.8417 | Btu/Lb/°F | | | | 1.8502 | 1.8502 | 1.8502 | Btu/Lb/°F |
| LP Steam Turbine Exhaust | | | | | | | | | | | | |
| Pressure | 0.7000 | 0.7000 | 0.7000 | 0.7000 | Psia | 0.01 | | | 0.7000 | 0.7000 | 0.7000 | Psia |
| Temperature | 90.09 | 90.09 | 90.09 | 90.09 | °F | | | | 90.09 | 90.09 | 90.09 | °F |
| Enthalpy | 1045.35 | 1039.07 | 1043.50 | 1037.32 | Btu/Lb | | | | 1056.90 | 1050.28 | 1043.76 | Btu/Lb |
| LP Turbine Available Energy | 331.07 | 314.52 | 331.07 | 314.52 | Btu/Lb | | | | 331.07 | 331.07 | 314.52 | Btu/Lb |
| LP Turbine Used Energy | 299.58 | 284.60 | 301.43 | 286.36 | Btu/Lb | | | | 288.03 | 294.65 | 279.92 | Btu/Lb |
| LP Turbine Output | 76385 | 66728 | 76856 | 67139 | kW | | | | 73439 | 75127 | 65629 | kW |
| LP Turbine Efficiency | 0.905 | 0.905 | 0.910 | 0.910 | % | | | | 87.00% | 89.00% | 91.00% | % |

FIG. 4C  LP Section Efficiency Precision

FIG. 5 - LP Efficiency Sensitivity to Measurement Error (Precision Instrumentation)

METHODS OF MEASURING STEAM TURBINE EFFICIENCY

CROSS REFERENCE TO RELATED APPLICATIONS

This application is a Continuation-In-Part of U.S. patent application Ser. No. 10/444,153 filed May 22, 2003 now U.S. Pat. No. 6,901,348.

BACKGROUND OF THE INVENTION

This invention relates generally to power generation facilities, and more specifically to a method of measuring an expansion efficiency of a turbine utilized in a power plant.

At least some known power plants include a low pressure steam turbine (LP) coupled with an intermediate pressure (IP) and/or high pressure (HP) steam turbine to drive a common generator. Measuring the steam turbine efficiency, i.e. a ratio of a measured enthalpy drop to an ideal (isentropic) enthalpy drop, of the LP steam turbine may be problematic when steam entering a condenser includes a mixture of saturated steam and water. Furthermore, accurately quantifying the quality and the enthalpy of steam in a wet region of the steam flow may also problematic.

Steam turbine section expansion efficiency is commonly measured when the expansion takes place entirely in a dry or superheated region because, in the case of superheated steam, the measured temperature and pressure expressly defines steam enthalpy. The expansion efficiency of an LP steam turbine section is normally not measured in the wet region since enthalpy is no longer only a function of pressure and temperature, but is also a function of a steam moisture content. Exhaust moisture is extremely difficult to measure, and as such exhaust moisture and LP steam turbine expansion efficiency, are typically calculated by measuring other quantities and performing an energy balance calculation. Although the HP turbine and IP turbine efficiency may be directly measured, by virtue of their superheated exhausts, the uncertainty in these measurements and in the HP, IP, and LP steam turbine flow results in undesirably high uncertainty in LP power output and derived efficiency.

BRIEF SUMMARY OF THE INVENTION

In one aspect, a method for measuring expansion efficiency of a turbine within a Rankine cycle steam power plant is provided. The method includes operating the power plant at a first load, wherein a steam turbine within the Rankine cycle steam power plant includes at least a first turbine exhausting superheated steam and a second turbine exhausting two phase steam. The method also includes determining a first shaft output at the first load with steam supplied from a heat recovery steam generator (HRSG) to both the first steam turbine inlet and the second steam turbine inlet, determining a second shaft output while the second steam turbine is isolated from the steam admission flow, and determining an expansion efficiency of the second steam turbine based on the first shaft output and the second shaft output and a measured change in the second steam turbine admission steam flow.

In another aspect, a method for measuring expansion efficiency of a turbine within a direct fired Rankine or combined cycle power plant is provided. The method includes operating the power plant at a first load, wherein a boiler or gas turbine is operated with a first fuel flow and a first inlet air flow, and wherein a steam turbine within the power plant includes at least a first turbine exhausting superheated steam and a second turbine exhausting two phase steam and determining a first shaft output at the first load with steam extracted from the second steam turbine to a process user. The method also includes determining a second shaft output at the first fuel flow without steam extraction from the second steam turbine to a process user, and determining a second shaft output at the first fuel flow without steam extraction from the second steam turbine to a process user.

In a still another aspect, a method for measuring expansion efficiency of a turbine within a direct fired Rankine cycle power plant is provided. The method includes operating a Rankine cycle steam power plant including at least one steam turbine at a first load (fuel and air flow to the boiler) and a first HP throttle steam flow, the steam turbine including a first turbine with superheated exhaust and a second turbine with two phase exhaust and uncontrolled steam extraction to a feedwater heater, and determining a first shaft output at the first load with steam extraction flow to the extraction feedwater heater from the second steam turbine inlet or after partial expansion in the second steam turbine. The method also includes determining a second shaft output at the first load (fuel and air flow to the boiler), the first HP throttle steam flow and the extraction from the second steam turbine to feedwater heating closed, and determining an expansion efficiency of the second steam turbine using the first shaft output, the second shaft output, and a change in extraction steam flow from the second steam turbine.

DETAILED DESCRIPTION OF THE INVENTION

Figure 1:
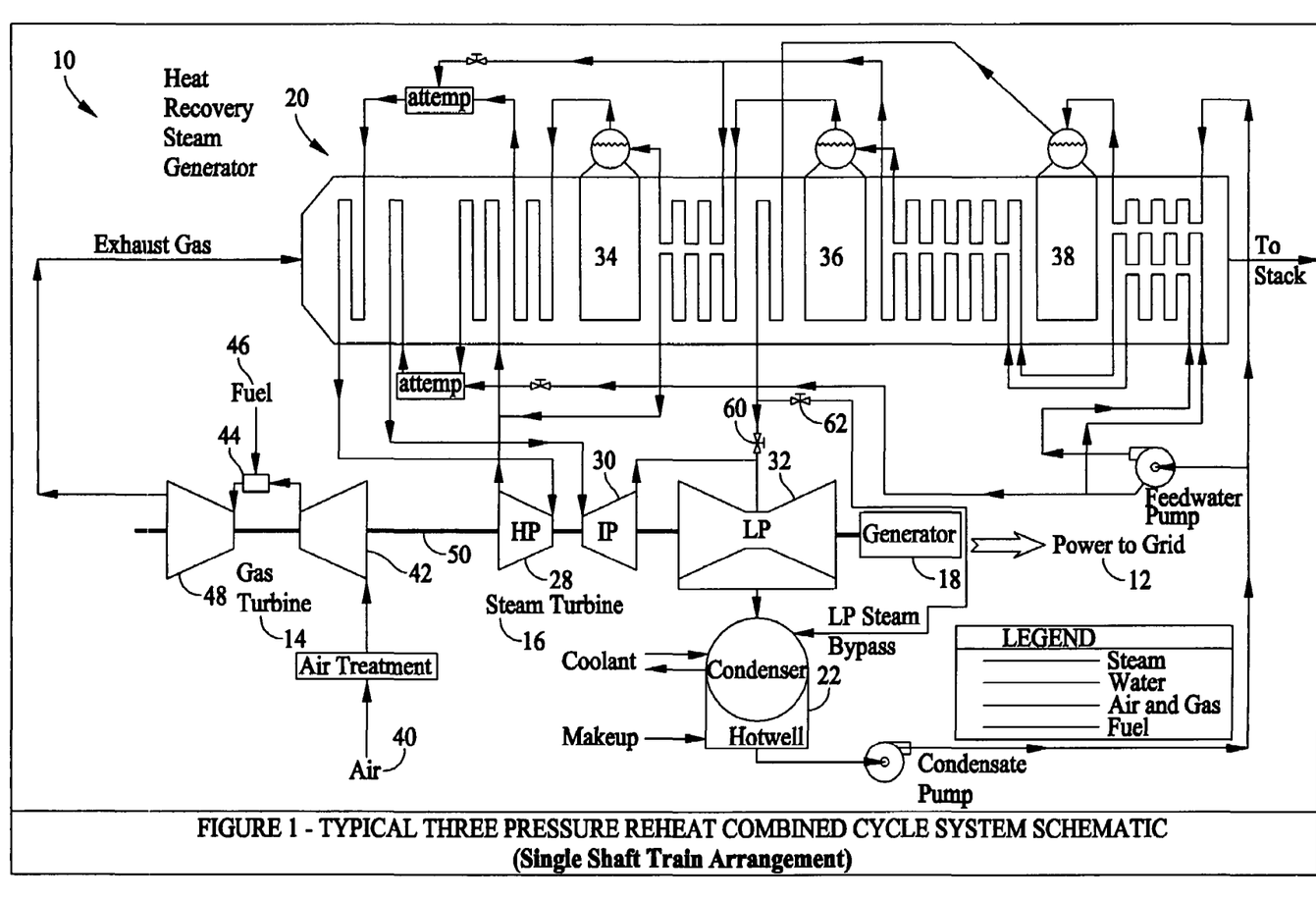
FIG. 1 is a schematic illustration of an exemplary single-shaft multi-pressure combined cycle power plant configured to supply energy to a power grid or another shaft power consumer.
Figure 2:
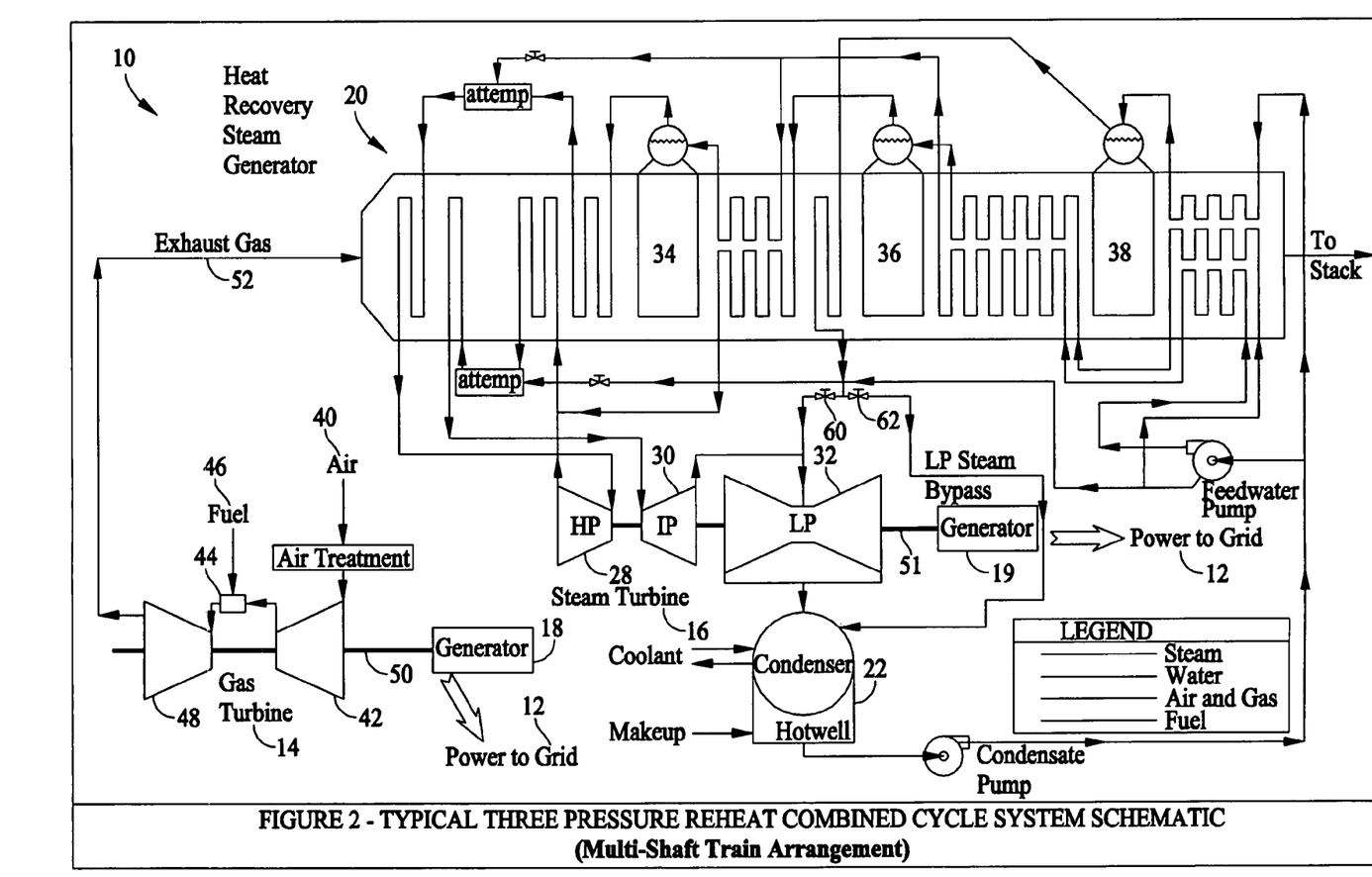
FIG. 2 is a schematic illustration of an exemplary multi-shaft multi-pressure combined cycle power plant configured to supply energy to a power grid or another shaft power consumer.

FIGS. 1 and 2 are schematic illustrations of an exemplary power plant 10 configured to supply energy to a power grid 12. In an exemplary embodiment, and referring to FIG. 1, power plant 10 is a multi-pressure, single-shaft combined cycle power plant 10 and includes a gas turbine 14 mechanically coupled to a steam turbine 16, and a common generator 18 via a shaft 50. Power plant 10 also includes a heat recovery steam generator (HRSG) 20, a condenser 22, and a plurality of pumps for repressurizng the condensate for supply to HRSG 20. In the exemplary embodiment, steam turbine 16 includes a High Pressure (HP) section 28, an Intermediate Pressure (IP) section 30, and a Low Pressure (LP) section 32. HRSG 20 includes a high pressure section 34, an intermediate pressure section 36, and a low pressure section 38.

In another embodiment, and referring to FIG. 2, power plant 10 is a multi-pressure, multi-shaft combined cycle power plant 10 wherein gas turbine 14 is mechanically coupled to generator 18 via shaft 50, and steam turbine 16 is mechanically coupled to a separate generator 19 via shaft 51. Power plant 10 is otherwise of the same configuration as shown FIG. 1.

In use, ambient air 40 is channeled into a turbine compressor section 42 and compressed. Compressed air is then directed into a combustion section 44 and mixed with fuel 46 and the mixture is ignited, and the combustion gases are channeled to rotate a turbine section 48. In FIG. 1, shaft 50 transmits the torque produced by gas turbine 14 and steam turbine 16 to either generator 18 to produce electricity, or to another power consuming load (not shown). In FIG. 2, shaft 50 transmits the torque produced by gas turbine 14 to either generator 18 to produce electricity, or to another power consuming load (not shown). Shaft 51 also transmits the torque produced by steam turbine 16 to either generator 19 to produce electricity, or to another power consuming load (not shown).

Exhaust heat from gas turbine 14 is introduced into HRSG 20 via an exhaust duct 52, wherein the exhaust heat is used to convert water supplied from steam turbine condenser 22 into steam for re-admission into steam turbine 16. Specifically, water from condenser 22 is supplied to each multiple pressure level (three in FIGS. 1 & 2). Steam generated in a high pressure section 34 (also called the main steam) is introduced into an inlet or throttle section of steam turbine HP section 28. The temperature and pressure of the steam decreases as it expands through HP section 28 until being directed to the cold reheat piping. The cold reheat piping channels the steam to HRSG 20 wherein additional heat is added using a reheater. This higher energy steam produced, called hot reheat steam, is directed into an inlet of steam turbine IP section 30. Steam temperature and pressure decrease as the steam expands through IP section 30 and is channeled into steam turbine LP section 32. In one embodiment, steam from HRSG low pressure section 38, also called admission steam, is supplied to LP section 32 via admission valve 60. Plant 10 also includes a plurality of bypass piping configured to bypass steam generated in HRSG sections 34, 36, and 38 to condenser 22 during startup conditions, and until steam conditions are suitable for steam turbine admission. Only the LP bypass, via valve 62, is shown in FIGS. 1 and 2. Many variations of multi-pressure combined cycle power systems exist, including, but not limited to, the three pressure reheat systems shown in FIGS. 1 and 2, as well as three pressure non-reheat, two pressure reheat, and two pressure non-reheat cycles, with numerous variations on equipment design and arrangement. The methods described herein are applicable to all of the aforementioned embodiments, provided LP steam can either be admitted to LP turbine 32, as through admission valve 60 (shown in FIGS. 1 and 2), or bypassed such that steam does not enter LP steam turbine 32, as through LP steam bypass valve 62 (shown in FIGS. 1 and 2).

After the steam has passed through LP section 32, the steam exhausts to condenser 22 to be condensed to water. The water is pumped back to HRSG 20 to restart the steam generation cycle again.

Figure 3:
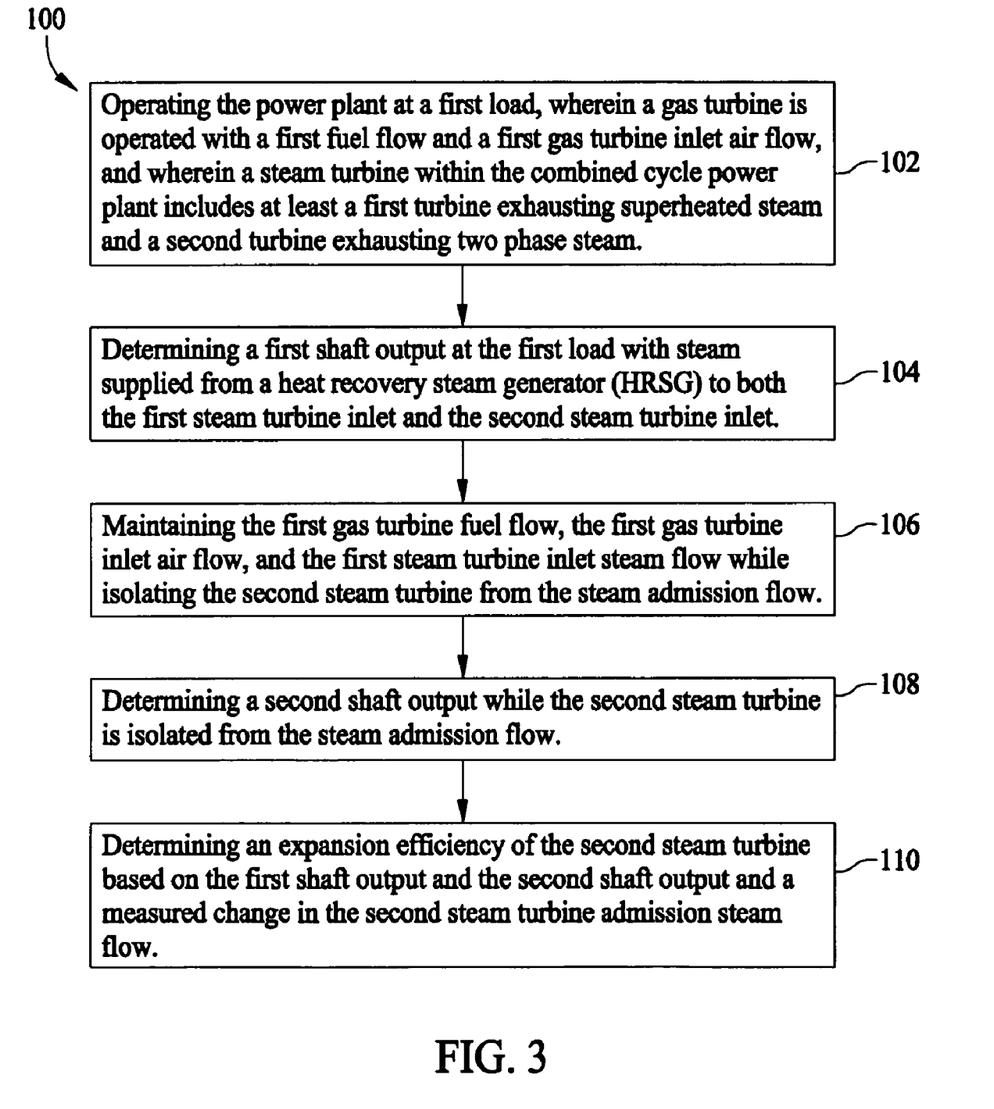
FIG. 3 is a method for measuring an expansion efficiency of a low-pressure (LP) steam turbine.

FIG. 3 is an exemplary method 100 for measuring the expansion efficiency of a low-pressure steam turbine and includes operating 102 a power plant at a first gas turbine air flow and fuel flow, wherein the power plant includes an HP steam turbine, and an LP steam turbine that accepts LP admission flow via a valve, such as valve 60. Method 100 also includes determining 104 a first shaft output at the first gas turbine inlet air flow and fuel flow, and maintaining 106 steam flows to the HP and IP steam turbines, and bypassing the LP admission steam to a condenser via a bypass valve, such as bypass valve 62. A second shaft output is then determined 108 at the first gas turbine air flow and fuel flow, and an expansion efficiency of LP turbine is determined 110 using the first shaft output and the second shaft output and the measured difference in LP admission flow to the LP steam turbine between method steps 104 and 108.

Method 100 also includes loading a combined cycle power plant, such as plant 10, to a target load for the test, typically base load, and then stabilizing power plant 10 with LP steam admitted to LP steam turbine 32. The following exemplary measurements are then taken using installed instrumentation either manually, or automatically using a data acquisition system:

Generator output ($kW_{(1)}$);
IP Turbine inlet steam flow ($W_{IP\ Inlet\ (1)}$);
IP Turbine inlet steam pressure ($P_{Ip\ Inlet\ (1)}$);
IP Turbine inlet steam temperature ($T_{Ip\ Inlet\ (1)}$);
IP Turbine exhaust steam pressure ($P_{Ip\ Exh\ (1)}$);
IP Turbine exhaust steam temperature ($T_{Ip\ Exh\ (1)}$);
LP Turbine admission steam flow ($W_{Lp\ Adm}$);
LP Turbine admission steam temperature ($T_{Lp\ Adm}$);
LP Turbine admission supply steam Pressure ($P_{Lp\ Adm}$);
LP bowl pressure ($P_{LpBowl\ (1)}$);
Condenser pressure ($P_{Exh\ (1)}$).

After the above parameters have been recorded, the LP steam admission valve is closed, and the LP steam is bypassed to a condenser, at the same time, fuel flow and air flow to the gas turbine remain substantially constant, i.e. fuel is not increased or decreased to the gas turbine, such that the change in output from the power plant is purely a function of the change in the LP admission steam flow to the LP section. The following exemplary measurements are then recorded:

Generator output ($kW_{(2)}$);
IP Turbine inlet steam flow ($W_{Ip\ Inlet\ (2)}$);
IP Turbine inlet steam pressure ($P_{Ip\ Inlet\ (2)}$);
IP Turbine inlet steam temperature ($T_{Ip\ Inlet\ (2)}$);
IP Turbine exhaust steam pressure ($P_{Ip\ Exh\ (2)}$);
IP Turbine exhaust steam temperature ($T_{Ip\ Exh\ (2)}$);
LP bowl pressure ($P_{LpBowl\ (2)}$);
Condenser pressure ($P_{Exh\ (2)}$).

In use, a first LP section efficiency ($\eta_1$) is estimated. The IP turbine and the LP turbine outputs are then calculated with and without steam admitted to the LP steam turbine. The IP efficiency for both calculations is aligned to the measured IP section efficiency with the LP admission closed. The expected change in a measured generator output $\Delta kW_1$ is then determined in accordance with:

$\Delta kW_1$=calculated (*IP+LP* Output) with admission–calculated (*IP+LP* Output) without admission.
Where LP Output is calculated using first LP section efficiency ($\eta_1$)

A second LP section efficiency ($\eta_2$) is estimated. The IP section and the LP section outputs are then calculated with and without steam admitted to the LP section. The IP section efficiency for both calculations is again aligned to the measured IP section efficiency with the LP admission closed. The expected change in a measured generator output $\Delta kW_2$ is then determined in accordance with:

$\Delta kW_2$=calculated (*IP+LP* Output) with admission−
calculated (*IP+LP* Output) without admission.
Where LP Output is calculated using second LP
section efficiency ($\eta_2$)

The LP section efficiency is then calculated in accordance with:

$$LP\ Section\ Efficiency = \eta_1 + (\eta_2 - \eta_1) * \frac{(kW_1 - kW_2) - \Delta kW_1}{\Delta kW_2 - \Delta kW_1};$$

where:
$\eta_1$ is a first turbine efficiency estimate,
$\eta_2$ is a second turbine efficiency estimate,
$kW_{(1)}$ is a first measurement of shaft output,
$kW_{(2)}$ is a second measurement of shaft output,
$\Delta kW_1$ is a difference between the first calculated shaft output and the second calculated shaft output using the first estimated efficiency ($\eta_1$), and
$\Delta kW_2$ is a difference between the first calculated shaft output and the second calculated shaft output using the second estimated efficiency ($\eta_2$).

The methods described herein can also be applied to other power plant configurations as long as the section efficiency immediately upstream of the LP admission can be directly measured. Additionally, the methods described herein can be accomplished manually or using a computer model which readily accounts for small changes in IP and LP section efficiencies due to a change in IP and LP exhaust pressures, when LP extraction steam is bypassed. Additionally, the model will account for the change in LP exhaust loss as a function of exhaust velocity and moisture, and generator electrical losses as a function of generator load.

In another embodiment, LP section efficiency can be calculated by iterating the computer model to match the measured ($kW_{(1)}$–$kW_{(2)}$) by manipulation of the estimated LP section efficiency. For example, the model initially predicts an LP section efficiency and then calculates the IP and LP outputs for both sets of measured statepoints, i.e. with and without steam admitted to the LP turbine. If the calculated $\Delta kW$ corresponds to the measured ($kW_{(1)}$–$kW_{(2)}$) then the correct LP efficiency has been determined. If the calculated $\Delta kW$ does not correspond to the measured ($kW_{(1)}$–$kW_{(2)}$) then the computer model selects another efficiency and recalculates the equation repeatedly (as required) until the correct efficiency has been determined.

Figure 4A:
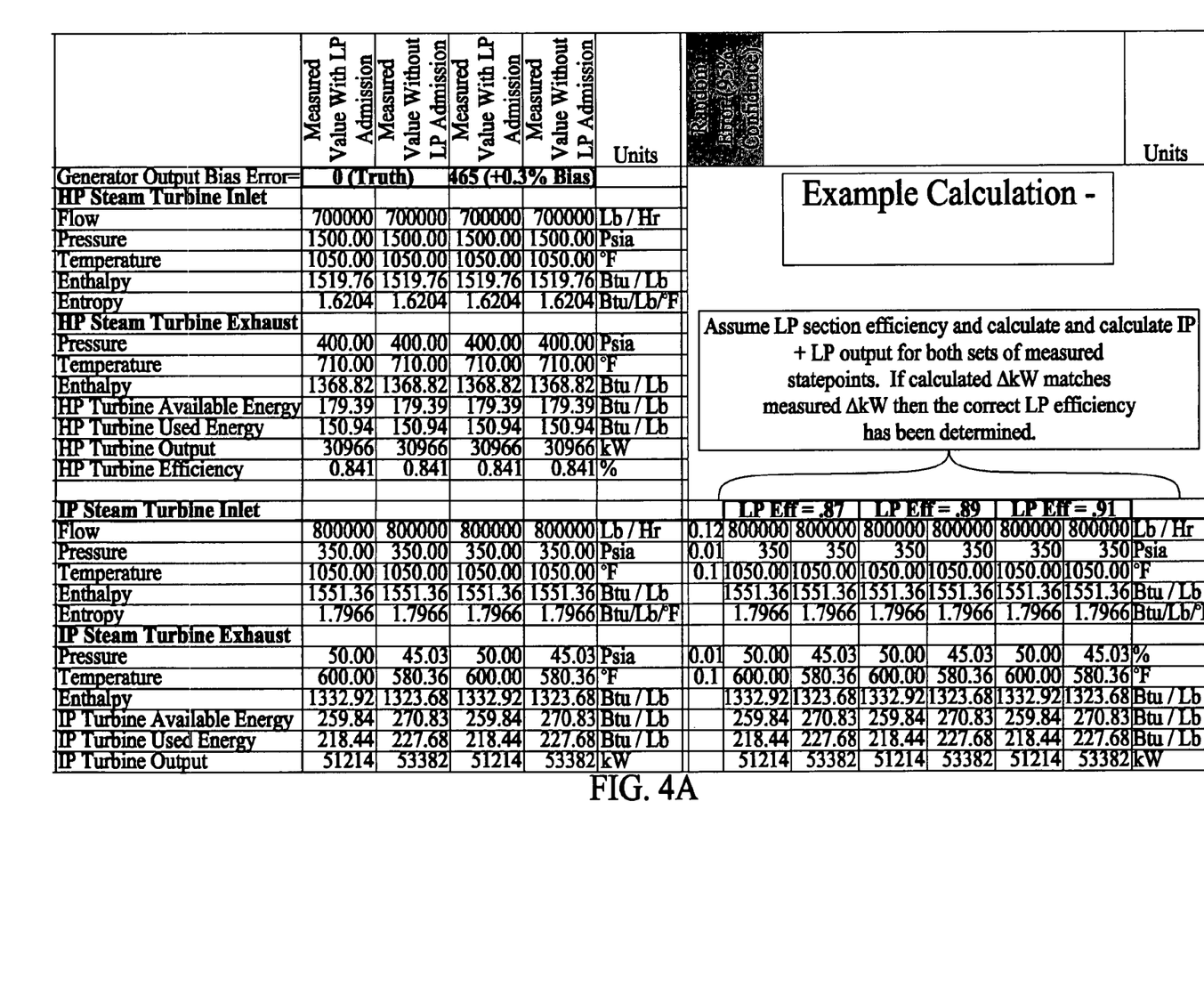
FIG. 4a is a first portion of a table illustrating exemplary results obtained using the method shown in FIG. 3.
Figure 4B:
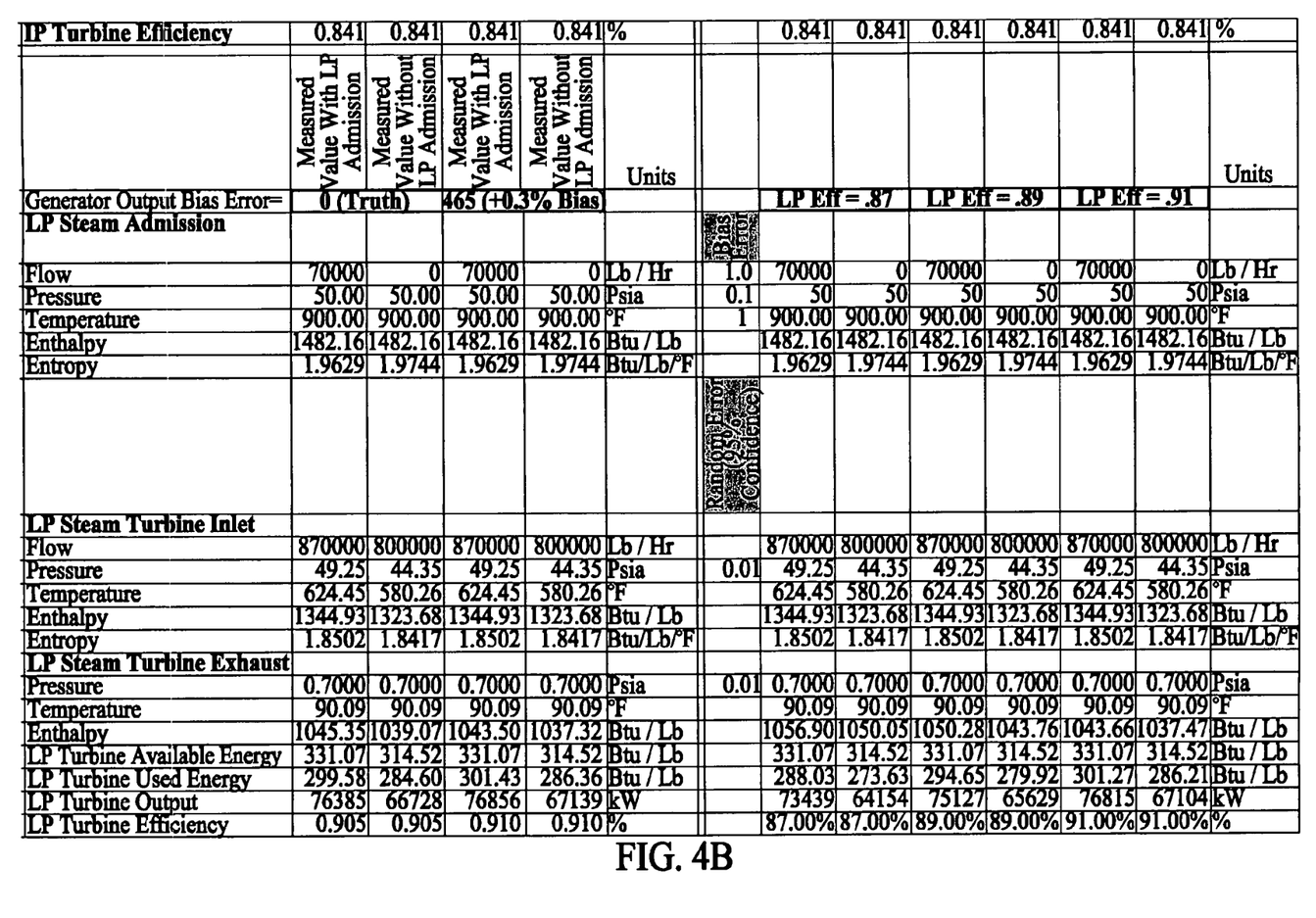
FIG. 4b is a second portion of a table illustrating exemplary results obtained using the method shown in FIG. 3.
Figure 4C:
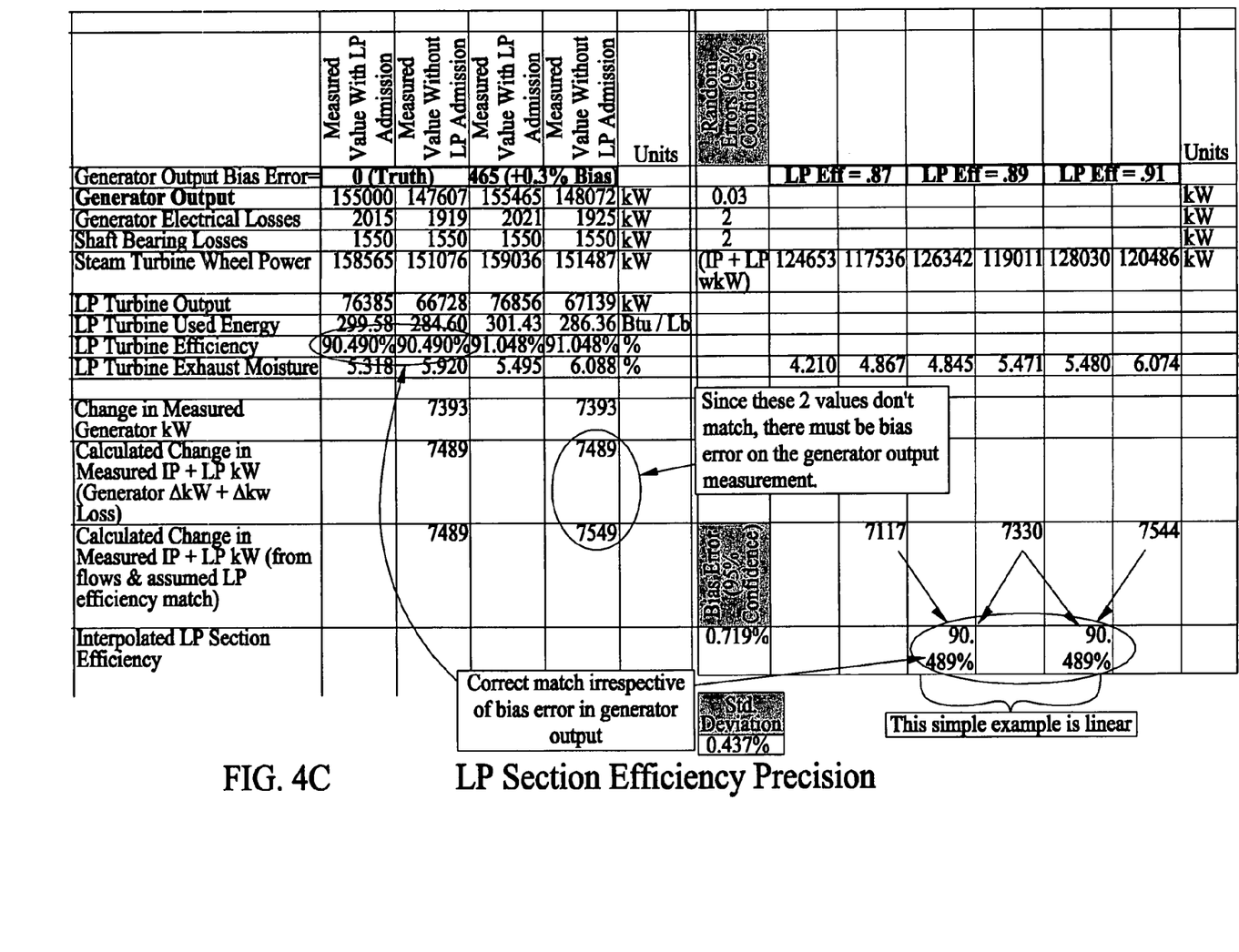
FIG. 4c is a third portion of a table illustrating exemplary results obtained using the method shown in FIG. 3.
Figure 5:
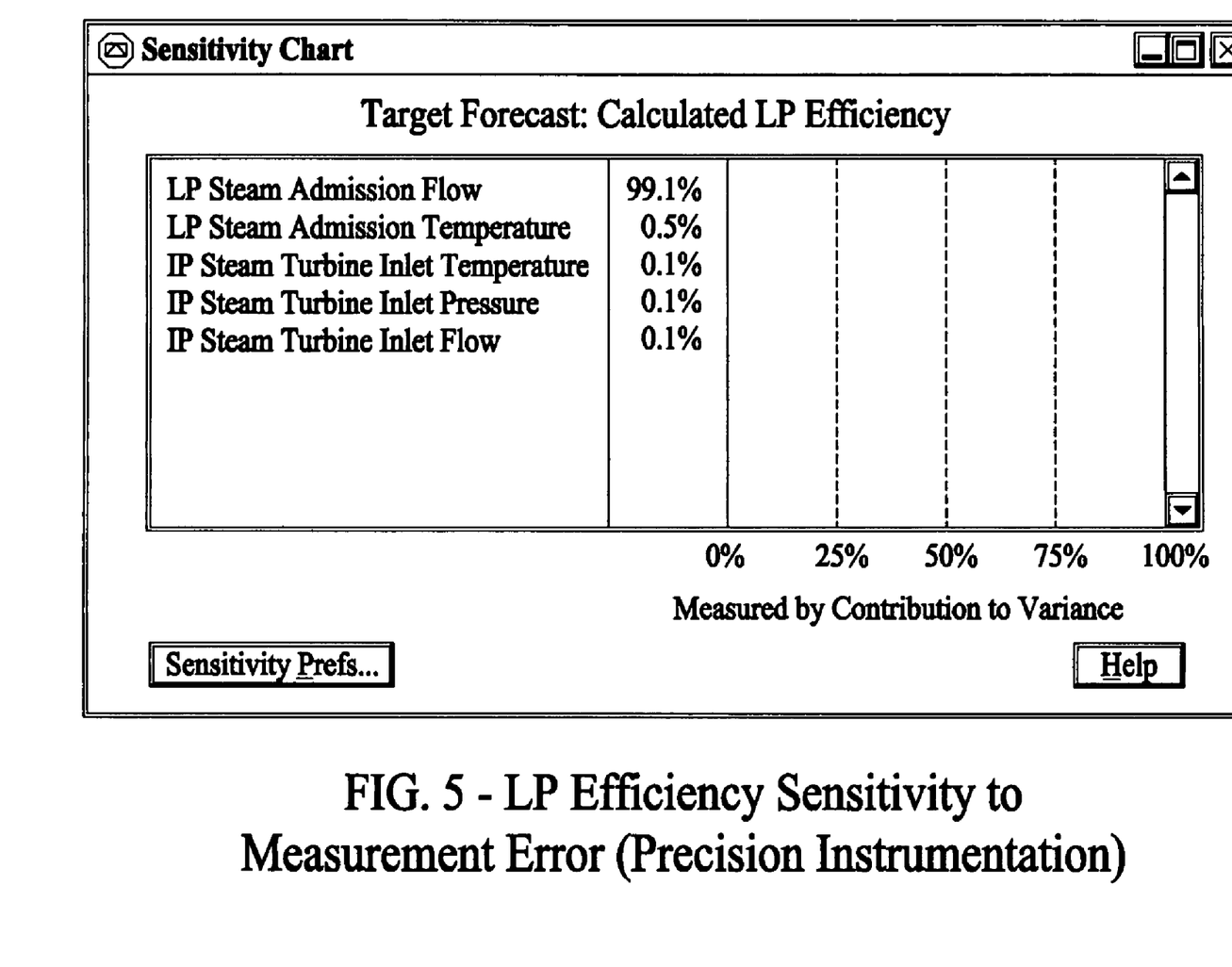
FIG. 5 is a table summarizing the sensitivity of turbine efficiency determined obtained using the method shown in FIG. 3.

FIG. 4*a* is a first portion of a table illustrating exemplary results obtained using the method shown in FIG. 3. FIG. 4*b* is a second portion of a table illustrating exemplary results obtained using the method shown in FIG. 3. FIG. 4*c* is a third portion of a table illustrating exemplary results obtained using the method shown in FIG. 3. Monte-Carlo simulation was used to model instrumentation bias error and random instrumentation error (noise) taken at 1/10th of the bias errors applied in the exemplary calculation. Drift is also negligible over the 30 minute test period given that normal recalibration intervals are typically counted in months. Accordingly, the only measurements where bias error is important to the accuracy of the resultant LP section efficiency determination are those associated with the LP admission, i.e. flow, pressure, and temperature. FIG. 5 is a table summarizing the sensitivity of turbine efficiency determined obtained using the method shown in FIG. 3 and confirming the error to be entirely a function LP steam flow measurement (bias) error. Although the examples illustrated in FIGS. 4A, 4B, and 4C assume precision instrumentation throughout, FIG. 5 illustrates that the only precision measurement needed is LP steam flow. It should also be noted that whereas at least one known heat balance method is essentially useless for a single shaft combined cycle as depicted in FIG. 1, where the gas turbine output must also be subtracted from the generator output, whereas the methods described herein are very nearly as accurate as in the multi-shaft case as depicted in FIG. 2. Whether a single-shaft or multi-shaft equipment arrangement is used, the present invention enables significantly improved LP section expansion efficiency precision.

Figure 6:
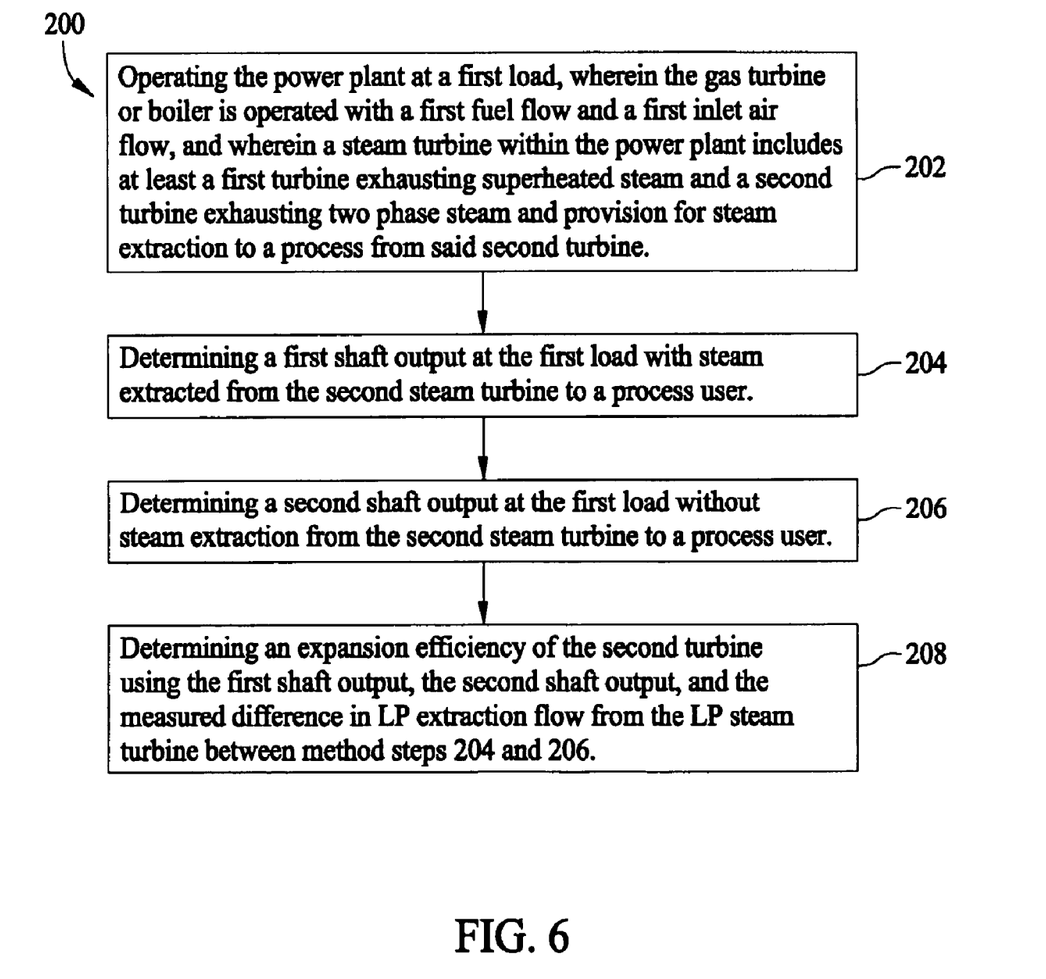
FIG. 6 is an exemplary method for measuring an expansion efficiency of a low-pressure (LP) steam turbine while the LP steam turbine is isolated from extraction flow to a process user.

FIG. 6 is a method 200 for measuring an expansion efficiency of a low-pressure steam turbine that includes operating 202 a combined cycle or direct fired Rankine power plant at a first load, wherein a gas turbine or boiler is operated with a first inlet air flow and a first fuel flow, and wherein the power plant includes at least an HP steam turbine and a LP steam turbine with provision for steam extraction to process. Method 200 also includes determining 204 a first shaft output at the first load (airflow and fuel flow) with steam extracted from the second steam turbine to a process user, either at it's inlet or after partial expansion, determining 206 a second shaft output at the first load without steam extraction from the second turbine to a process user, and determining 208 an expansion efficiency of the second turbine using the first shaft output, the second shaft output, and the measured difference in LP extraction flow from the LP steam turbine between method steps 204 and 206.

In use a performance test and a data analysis procedure are used to determine the expansion efficiency of LP steam turbine. The following exemplary measurements are then taken manually using installed instrumentation, or automatically using a data acquisition system:

Generator output ($kW_{(1)}$);
IP Turbine inlet steam flow ($W_{IP\ Inlet\ (1)}$);
IP Turbine inlet steam pressure ($P_{Ip\ Inlet\ (1)}$);
IP Turbine inlet steam temperature ($T_{Ip\ Inlet\ (1)}$);
IP Turbine exhaust steam pressure ($P_{Ip\ Exh\ (1)}$);
IP Turbine exhaust steam temperature ($T_{Ip\ Exh\ (1)}$);
LP Turbine extraction steam flow ($W_{Lp\ Ext}$);
LP Turbine extraction port steam temperature ($T_{Lp\ Ext}$);
LP Turbine extraction port steam pressure ($P_{Lp\ Ext}$);
LP bowl pressure ($P_{LpBowl\ (1)}$);
Condenser pressure ($P_{Exh\ (1)}$).

After the above parameters have been recorded, the LP steam extraction valve is closed, at the same time fuel flow and air flow to the gas turbine or boiler remain substantially constant, i.e. fuel is not increased or decreased to the boiler, such that the change in output from the LP section is purely a function of the change in LP steam extracted from the LP section. The following exemplary measurements are then recorded:

Generator output ($kW_{(2)}$);
IP Turbine inlet steam flow ($W_{IP\ Inlet\ (2)}$);
IP Turbine inlet steam pressure ($P_{Ip\ Inlet\ (2)}$);
IP Turbine inlet steam temperature ($T_{Ip\ Inlet\ (2)}$);
IP Turbine exhaust steam pressure ($P_{Ip\ Exh\ (2)}$);
IP Turbine exhaust steam temperature ($T_{Ip\ Exh\ (2)}$);
LP Turbine extraction port steam temperature ($T_{LP\ Ext}$);
LP Turbine extraction port steam pressure ($P_{Lp\ Ext}$);
LP bowl pressure ($P_{LpBowl\ (2)}$);
Condenser pressure ($P_{Exh\ (2)}$).

In use, a first LP section expansion efficiency ($\eta_1$) is estimated. The IP and LP output are then calculated with and without steam extraction from the LP steam turbine. The IP efficiency for both calculations is calibrated to the measured IP section efficiency with the LP extraction valve closed. The expected change in a measured generator output $\Delta kW_1$ is then determined in accordance with:

$\Delta kW_1$=calculated (*IP+LP* Output) without extraction−
calculated (*IP+LP* Output) with extraction.
Where LP Output is calculated using first LP
section efficiency ($\eta_1$)

A second LP section efficiency ($\eta_2$) is estimated. The IP and LP Output are then calculated with and without steam extraction from the LP steam turbine. The IP efficiency for both calculations is calibrated to the measured IP section efficiency with the LP extraction valve closed. The expected change in a measured generator output $\Delta kW_2$ is then determined in accordance with:

$\Delta kW_2$=calculated (*IP+LP* Output) without extraction−
calculated (*IP+LP* Output) with extraction.
Where LP Output is calculated using second LP
section efficiency ($\eta_2$)

LP steam turbine 32 efficiency can be calculated in accordance with:

$$LP \text{ Section Efficiency} = \eta_1 * (\eta_2 - \eta_1) * \frac{(kW_1 - kW_2) - \Delta kW_1}{\Delta kW_2 - \Delta kW_1} \text{ where:}$$

$\eta_1$ is a first turbine efficiency estimate;
$\eta_2$ is a second turbine efficiency estimate;
$kW_{(1)}$ is a first measurement of shaft output;
$kW_{(2)}$ is a second measurement of shaft output; and
$\Delta kW_1$ is a difference between the first measurement of shaft output and the second measurement of shaft output.

Alternatively, a computer performance model of the plant can be iterated to match the measured (kW(1)−kW(2)) by manipulation of assumed LP section efficiency.

Figure 7:
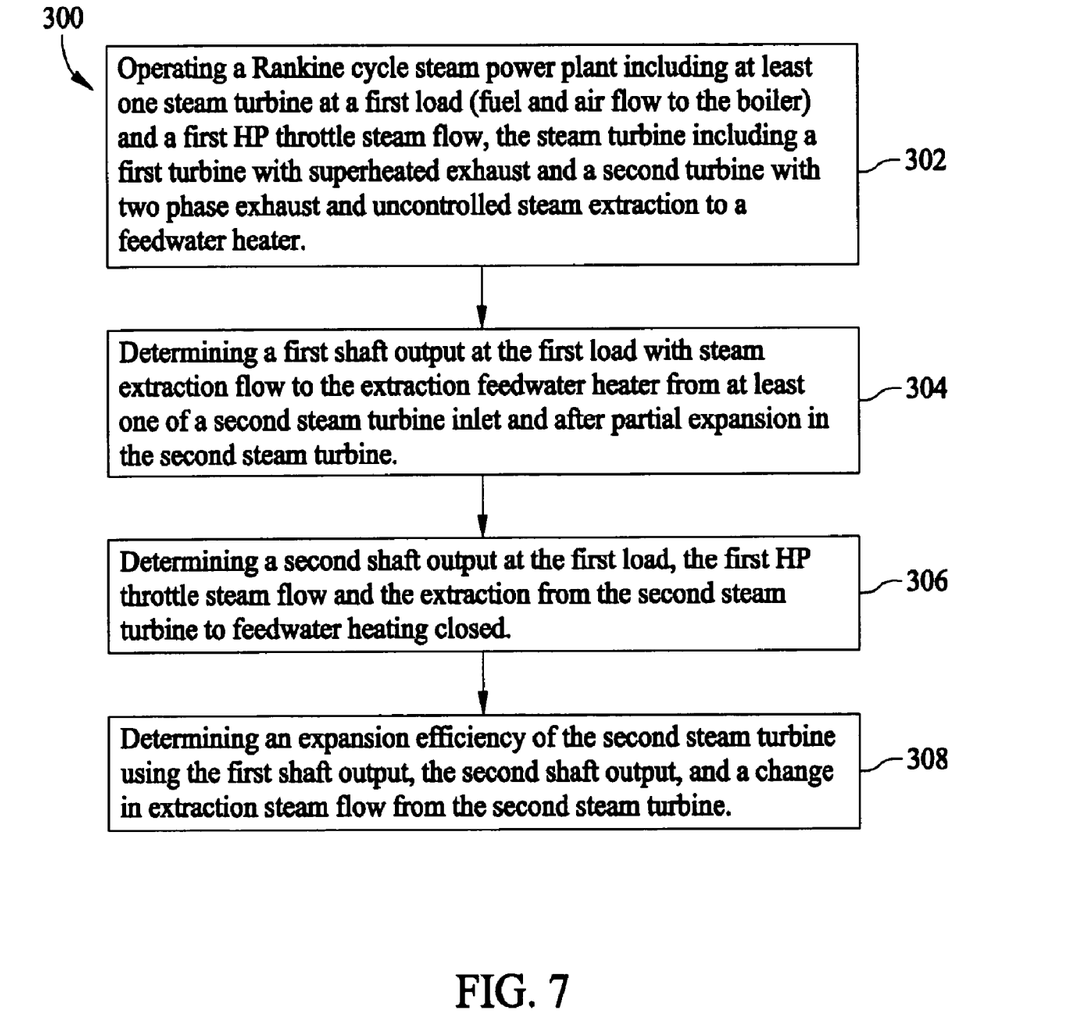
FIG. 7 is an exemplary method for measuring an expansion efficiency of a low-pressure (LP) steam turbine while the LP steam turbine extraction flow to an extraction feedwater heater is isolated.

FIG. 7 is a method 300 for measuring an expansion efficiency of an LP steam turbine that includes operating 302 a Rankine cycle steam power plant including a steam turbine at a first load, and a first HP throttle steam flow, wherein the steam turbine includes an HP steam turbine with a superheated exhaust and an LP steam turbine with a two-phase exhaust and uncontrolled steam extraction flow to a feedwater heater. Method 300 also includes, determining 304 a first shaft output at the first load and the first HP throttle flow while maintaining steam flow to the HP steam turbine and an IP steam turbine while the LP extraction supply to an extraction feedwater heater is closed using an extraction control valve, determining 306 a second shaft output at the first load, the first HP throttle flow steam flow and the extraction from the second steam turbine to feedwater heating closed, and determining 310 an expansion efficiency of the LP turbine using the first shaft output, the second shaft output, and the measured difference in LP extraction flow from the LP steam turbine, and any other extraction flows impacted by closing the LP turbine extraction, between method steps 304 and 306.

In use a performance test and a data analysis procedure are used to determine the expansion efficiency of LP steam turbine. At least the following measurements are then taken using installed instrumentation either manually, or automatically using a data acquisition system:

Generator output ($kW_{(1)}$);
IP Turbine inlet steam flow ($W_{Ip\ Inlet\ (1)}$);
IP Turbine inlet steam pressure ($P_{Ip\ Inlet\ (1)}$);
IP Turbine inlet steam temperature ($T_{Ip\ Inlet\ (1)}$);
IP Turbine exhaust steam pressure ($P_{Ip\ Exh\ (1)}$);
IP Turbine exhaust steam temperature ($T_{Ip\ Exh\ (1)}$);
LP Turbine extraction steam flow ($W_{Lp\ Ext}$);
LP Turbine extraction steam temperature ($T_{Lp\ Ext}$);
LP Turbine extraction steam pressure ($P_{Lp\ Ext}$);
LP bowl pressure ($P_{LpBowl\ (1)}$);
Condenser pressure ($P_{Exh\ (1)}$).

After the above parameters have been recorded, the LP steam extraction valve is closed while maintaining constant HP steam turbine throttle flow. The change in output from LP section 32 is primarily a function of the change in LP steam extracted from LP section 32 but in this embodiment will also be influenced by changes in other upstream uncontrolled extraction flows. For this reason the plant should be operated during this test with as few extraction feedwater heaters in operation as possible to keep the LP expansion efficiency and output calculations as simple as possible and reduce sources of measurement uncertainty. At least the following measurements are then recorded:

Generator output ($kW_{(2)}$);
IP Turbine inlet steam flow ($W_{Ip\ Inlet\ (2)}$);
IP Turbine inlet steam pressure ($P_{Ip\ Inlet\ (2)}$);
IP Turbine inlet steam temperature ($T_{Ip\ Inlet\ (2)}$);
IP Turbine exhaust steam pressure ($P_{Ip\ Exh\ (2)}$);
IP Turbine exhaust steam temperature ($T_{Ip\ Exh\ (2)}$);
LP bowl pressure ($P_{LpBowl\ (2)}$);
Condenser pressure ($P_{Exh\ (2)}$).

Note that in the case of a unit with multiple extraction feedwater heaters it may (based on instrumentation uncertainties) be more accurate to calculate the LP extraction flows based on the energy balance around each feedwater heater from measured feedwater flow, heater inlet and outlet temperatures, drain temperatures, and heater operating pressures. In use, a first LP section efficiency ($\eta_1$) is estimated. The IP and LP Output are then calculated with and without steam extraction from LP steam turbine 32. The expected change in a measured generator output $\Delta kW_1$ is then determined in accordance with computer model prediction.

A second LP section efficiency ($\eta_2$) is estimated. The IP and LP Output are then calculated with and without steam extraction from LP steam turbine 32. The IP efficiency for both calculations is calibrated to the measured IP section efficiency with the LP extraction valve closed. The expected change in a measured generator output $\Delta kW_2$ is then determined in accordance with computer model prediction.

LP steam turbine 32 efficiency can be calculated in accordance with:

$$LP \text{ Section Efficiency} = \eta_1 * (\eta_2 - \eta_1) * \frac{(kW_2 - kW_1) - \Delta kW_1}{\Delta kW_2 - \Delta kW_1} \text{ where:}$$

$\eta_1$ is a first turbine efficiency estimate;
$\eta_2$ is a second turbine efficiency estimate;
$kW_{(1)}$ is a first measurement of shaft output;
$kW_{(2)}$ is a second measurement of shaft output; and
$\Delta kW_1$ is a difference between the first measurement of shaft output and the second measurement of shaft output. Alternatively, a computer performance model of the plant can be iterated to match the measured (kW(1)−kW(2)) by manipulation of assumed LP section efficiency.

An exemplary embodiment of a plurality of methods for measuring expansion efficiency of a low pressure steam turbine are described above in detail. The above-described methods for measuring expansion efficiency of a turbine provide an efficient and effective method of measuring the expansion efficiency of a low pressure turbine used in a combined cycle or Rankine cycle plant. The methods illustrated are not limited to the specific embodiments described herein, but rather, may be utilized in a wide variety of steam turbine applications.

While the invention has been described in terms of various specific embodiments, those skilled in the art will recognize that the invention can be practiced with modification within the spirit and scope of the claims.

What is claimed is:

1. A method for measuring expansion efficiency of a turbine within a power plant, said method comprising:
operating a Rankine cycle steam power plant including at least one steam turbine at a first load and a first HP throttle steam flow, the steam turbine including a first turbine with superheated exhaust and a second turbine with two phase exhaust and steam extracted to an extraction feedwater heater;
determining a first shaft output at the first load with steam extraction flow to the extraction feedwater heater from either a second steam turbine inlet or after partial expansion in the second steam turbine;
determining a second shaft output at the first load, the first HP throttle steam flow and the extraction from the second steam turbine to feedwater heating closed; and
determining an expansion efficiency of the second steam turbine using the first shaft output, the second shaft output, and a change in extraction steam flow from the second steam turbine.

2. A method in accordance with claim 1 wherein operating the at least one steam turbine at a first load and the first HP throttle flow, the steam turbine including at least a first turbine and a second turbine, the steam turbine further comprises a High Pressure/Intermediate Pressure (HP/IP) steam turbine and a Low Pressure (LP) steam turbine.

3. A method in accordance with claim 1 wherein determining an expansion efficiency of the second steam turbine comprises:
estimating an initial expansion efficiency of the second steam turbine; and
estimating a second expansion efficiency of the second steam turbine different than the initial turbine expansion efficiency.

4. A method in accordance with claim 1 further comprising measuring the LP turbine expansion efficiency using an iterative computer performance model also including calculated changes in the second steam turbine exhaust loss, generator losses, and feedwater heater extraction conditions.

5. A method in accordance with claim 3 wherein measuring an expansion efficiency of the second steam turbine is in accordance with:

$LP$ Section Efficiency (Final steam turbine) =

$$\eta_1 + (\eta_2 - \eta_1) * \frac{(kW_1 - kW_2) - \Delta kW_1}{\Delta kW_2 - \Delta kW_1} \quad \text{where:}$$

$\eta_1$ is an initial turbine efficiency estimate;
$\eta_2$ is a second turbine efficiency estimate;
$kW_{(1)}$ is a first measurement of shaft output;
$kW_{(2)}$ is a second measurement of shaft output;
$\Delta kW_1$ is a calculated difference between the first measurement of shaft output and the second measurement of shaft output using the initial estimated efficiency for the second steam turbine and measured efficiency for the first steam turbine; and
$\Delta kW_2$ is a calculated difference between the first measurement of shaft output and the second measurement of shaft output using the second estimated efficiency for the second steam turbine and measured efficiency for the first steam turbine.

* * * * *

UNITED STATES PATENT AND TRADEMARK OFFICE
CERTIFICATE OF CORRECTION

| | | |
|---|---|---|
| PATENT NO. | : 7,634,385 B2 | Page 1 of 1 |
| APPLICATION NO. | : 11/108299 | |
| DATED | : December 15, 2009 | |
| INVENTOR(S) | : Raub Warfield Smith | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 905 days.

Signed and Sealed this

Twenty-first Day of December, 2010

David J. Kappos
*Director of the United States Patent and Trademark Office*